United States Patent
Mushkin et al.

(10) Patent No.: US 12,489,948 B2
(45) Date of Patent: Dec. 2, 2025

(54) DYNAMIC CONVERSATION-BASED VIDEO FEEDBACK SYSTEM

(71) Applicant: Lumiere AI LLC, Beverly, MA (US)

(72) Inventors: Steve Mushkin, Beverly, MA (US); Christopher Simpkins, North Smithfield, RI (US)

(73) Assignee: Lumiere AI LLC, Beverly, MA (US)

( * ) Notice: Subject to any disclaimer, the term of this patent is extended or adjusted under 35 U.S.C. 154(b) by 0 days.

(21) Appl. No.: 18/976,943

(22) Filed: Dec. 11, 2024

(65) Prior Publication Data
US 2025/0193491 A1     Jun. 12, 2025

Related U.S. Application Data

(60) Provisional application No. 63/608,887, filed on Dec. 12, 2023.

(51) Int. Cl.
*H04N 21/466* (2011.01)
*H04N 21/472* (2011.01)

(52) U.S. Cl.
CPC ... *H04N 21/4666* (2013.01); *H04N 21/47205* (2013.01)

(58) Field of Classification Search
CPC ............ H04N 21/4666; H04N 21/47205
USPC .................................................. 725/46
See application file for complete search history.

(56) References Cited

U.S. PATENT DOCUMENTS

| 2006/0256210 A1* | 11/2006 | Ryall | H04N 21/854 |
| | | | 348/231.2 |
| 2023/0044057 A1* | 2/2023 | Kang | H04N 21/858 |
| 2025/0103642 A1* | 3/2025 | Krishna | G06F 16/54 |

FOREIGN PATENT DOCUMENTS

| WO | WO-2024254051 A1 * | 12/2024 | ........... G06V 10/74 |
| WO | WO-2025054437 A1 * | 3/2025 | ......... G06V 30/1456 |
| WO | WO-2025084447 A1 * | 4/2025 | ......... H04N 21/8541 |

* cited by examiner

*Primary Examiner* — Benjamin R Bruckart
*Assistant Examiner* — Alexander Boyd
(74) *Attorney, Agent, or Firm* — Blueshift IP; Robert Plotkin

(57) ABSTRACT

A computer system engages in a dynamic conversation with a viewer of a video while the video is being played. The system generates prompts to the viewer based on one or more of the following: previous inputs received from the viewer, content of the video, information extracted from the video (such as objects, characters, and scenes in the video), and external information (such as information about the series that contains the video). The system may use a trained model, such as a large language model (LLM), to generate the prompts. The conversation may be initiated by the system or by the viewer. The system may generate and adapt additional prompts based on the responses that the viewer provides to previous prompts in the conversation.

14 Claims, 2 Drawing Sheets

DYNAMIC CONVERSATION-BASED VIDEO FEEDBACK SYSTEM

BACKGROUND

Video content is a cornerstone of modern digital media across various genres and platforms, from education and corporate training to entertainment and social media. Viewer feedback has become essential, enabling content creators to assess and improve their work, empowering viewers to influence the creation of content that is tailored to their preferences and needs, and fostering a participatory culture that engages the audience beyond mere passive viewership.

Existing video feedback technologies include comment sections, live reaction tracking, polls, direct rating systems, and integrated feedback forms. These technologies aim to bridge the communication gap between video content providers and their audiences, providing valuable data that can inform content strategy, design, and delivery. They are critical in educational platforms for fostering discussions, in streaming services for gauging real-time reactions, and in social media for enhancing engagement.

Yet, existing video feedback technologies face challenges in effectively handling the sheer volume and complexity of user interactions, in motivating users to provide relevant feedback repeatedly over time, in capturing feedback in real-time while maintaining a seamless viewing experience, in enabling content creators and owners to capture viewer sentiment and to extract meaning from user feedback, and in doing so using intuitive and enjoyable user interfaces.

There is a clear need for advancements to address these limitations to provide an improved user experience.

SUMMARY

A computer system engages in a dynamic conversation with a viewer of a video while the video is being played. The system generates prompts to the viewer based on one or more of the following: previous inputs received from the viewer, content of the video, information extracted from the video (such as objects, characters, and scenes in the video), and external information (such as information about the series that contains the video). The system may use a trained model, such as a large language model (LLM), to generate the prompts. The conversation may be initiated by the system or by the viewer. The system may generate and adapt additional prompts based on the responses that the viewer provides to previous prompts in the conversation.

Other features and advantages of various aspects and embodiments of the present invention will become apparent from the following description and from the claims.

DETAILED DESCRIPTION

Figure 1:
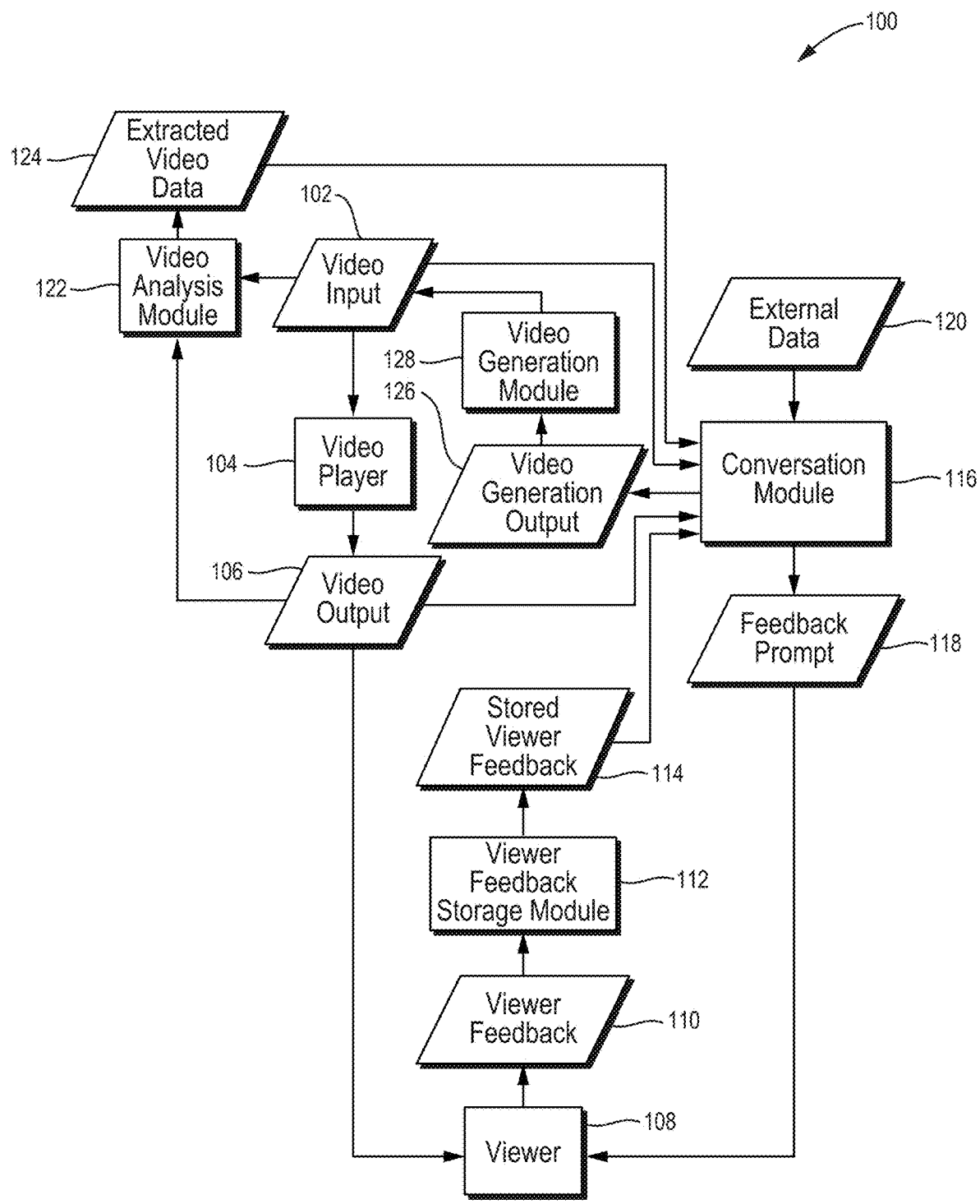
FIG. 1 is a dataflow diagram of a system for dynamically engaging in a conversation with a viewer to receive the viewer's feedback on one or more videos according to one embodiment of the present invention.
Figure 2:
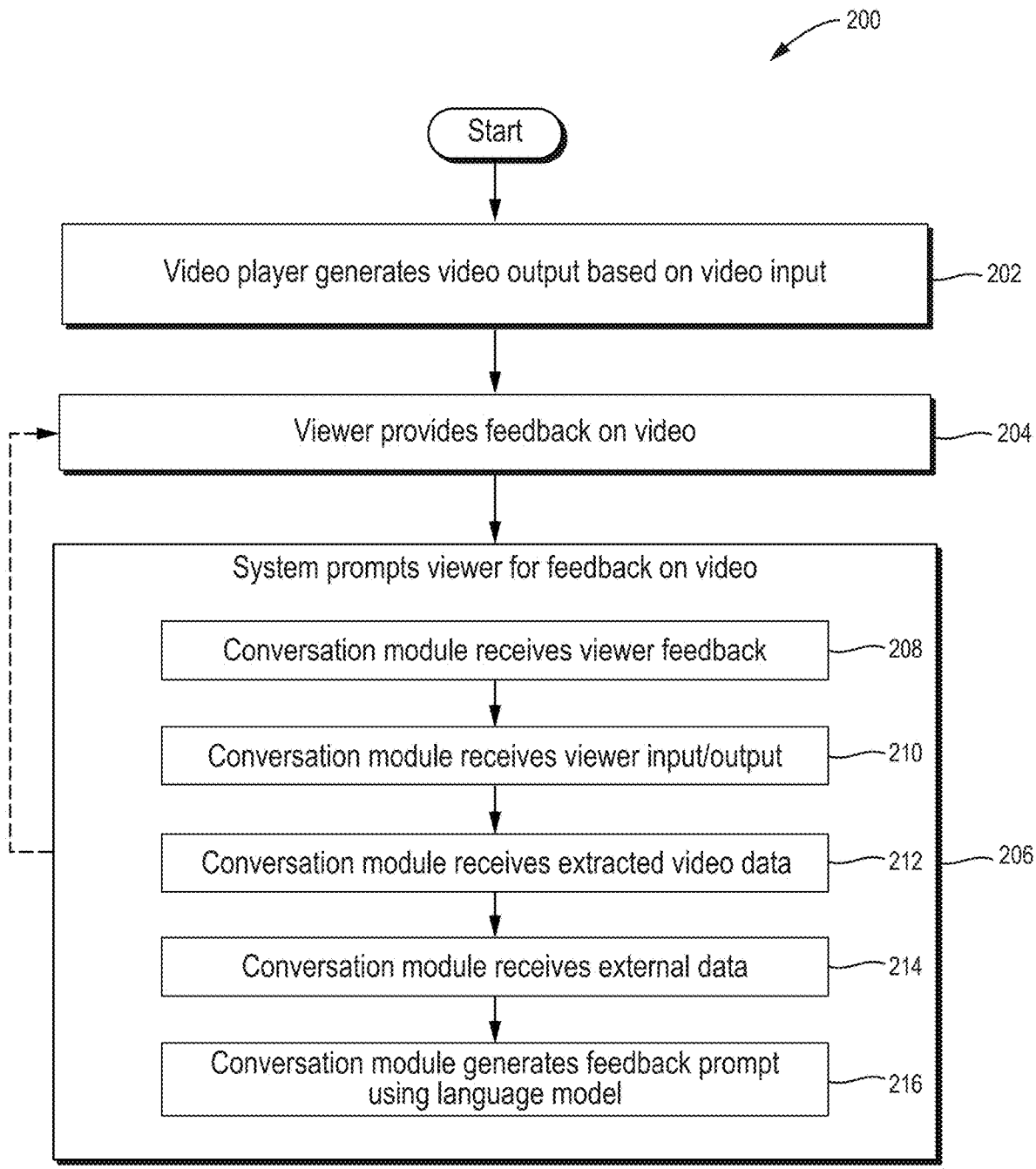
FIG. 2 is a flowchart of a method that is performed by the system of FIG. 1 according to one embodiment of the present invention.

Referring to FIG. 1, a dataflow diagram is shown of a system 100 for dynamically engaging in a conversation with a viewer 108 to receive the viewer 108's feedback on one or more videos according to one embodiment of the present invention. Referring to FIG. 2, a flowchart is shown of a method 200 that is performed by the system 100 according to one embodiment of the present invention.

The system 100 includes video input 102, a video player 104, and video output 106. The video player 104 serves as an intermediary processing module, which receives the video input 102 and processes it to generate the video output 106 (FIG. 2, operation 202). The video input 102 may, for example, be a stored video file or a live video stream. The video input 102 may, for example, be or include a product video, such as a prerecorded demonstration, review, or unboxing of a product.

The video input 102 may include any of a variety of content types. For example, the video input 102 may include entertainment content, such as movies, television shows, web series, music videos, gaming content, or other content designed primarily to entertain viewers. As another example, the video input 102 may include educational and learning content, such as instructional videos, academic lectures, training materials, scientific demonstrations, language learning content, or other content designed to facilitate learning and comprehension. As another example, the video input 102 may include persuasive content, such as brand videos, product promotions, advertising content, movie trailers, political communications, or other content designed to influence viewer perspectives or actions.

The system 100's capabilities for enabling dynamic conversations with viewers are applicable across all these content categories. For example, with educational content, the system 100 may engage viewers in conversations to test comprehension, explore concepts in greater depth, or facilitate creative learning approaches. With entertainment content, the system 100 may discuss narrative elements, character development, or creative interpretations. With persuasive content, the system 100 may explore viewer reactions to messaging, brand perceptions, or product features.

Embodiments of the present invention are not limited to any particular type of video content. Rather, the system 100's ability to analyze video content, capture temporally and spatially precise feedback, and engage in dynamic conversations with viewers can be applied to any form of video content that may benefit from viewer interaction and feedback.

If the video input 102 is a stored video file, it may be stored in any of a variety of formats, such as MP4, AVI, MKV, MOV, or WebM. In cases in which the video input 102 is a stored file, the video player 104 may decode the video input 102's data, converting compressed video and audio streams into a format suitable for playback. The decoding process may involve buffer management to ensure smooth playback without interruptions.

If the video input 102 is a live video stream, it may be streamed by the video player 104 using any of a variety of streaming protocols, such as HTTP Live Streaming (HLS), Dynamic Adaptive Streaming over HTTP (DASH), Real-Time Messaging Protocol (RTMP), Real-Time Streaming Protocol (RTSP), Microsoft Smooth Streaming, or Adobe HTTP Dynamic Streaming (HDS). In cases in which the video input 102 is a live video stream, the video player 104 may utilize streaming protocols such as HLS or MPEG-DASH. The video player 104 may receive data packets over a network (e.g., the Internet), buffer a small portion to account for network variability, and decode the stream for playback. The video player 104 may manage network conditions by adjusting the quality of the stream to prevent buffering.

The video player 104 may generate video output 106 locally, meaning that the video player 104 may execute on a computing device and provide the video output 106 on that computing device. The video input 102 may also be stored on the same computing device. The video player 104 may display the video output 106 on a device's screen or through an attached display interface. Generating such local output may include rendering the decoded video frames of the video output 106 to the screen while synchronizing the audio output with the video.

The video player 104 may be configured to stream video output 106 over a network (e.g., the Internet). In this scenario, the video player 104 may encode the video output 106 into a suitable format for transmission, which may include compressing data in the video output 106 to reduce bandwidth usage. The video player 104 may segment the encoded video output 106 and send it to a server, from where the video output 106 may be distributed to one or more end users, allowing for playback on one or more remote devices. As this implies, the video player 104 may execute on one computing device and the video output 106 may be output by one or more different computing devices.

The viewer 108 may, for example, be a human user. Alternatively, the viewer 108 may, for example, be a device and/or software (e.g., a software agent) that performs any of the functions disclosed herein in connection with the viewer 108 automatically or semi-automatically (e.g., in response to input from a human user). The video output 106 is shown in FIG. 1 as being provided to the viewer 108. The video output 106 may be provided to the viewer 108 directly or indirectly. For example, the video output 106 may include visual output (e.g., displayed on a display screen) and/or auditory output (e.g., generated by one or more speakers), in which case the viewer 108 may perceive the video output 106 directly. As an example, a computing device (such as a computing device on which the video player 104 executes) may generate such visual and/or auditory output. Alternatively, for example, the video output 106 may be provided (e.g., transmitted over a network) by the video player 104 to a computing device (not shown in FIG. 1), such as a computing device that is local to the viewer 108, and such a computing device may in turn generate visual and/or auditory output, based on the video output 106, that is perceived by the viewer 108. As these examples illustrate, any function disclosed herein as being performed by the viewer 108 (e.g., receiving the video output 106) may be performed, in whole or in part, by one or more devices (e.g., one or more computing devices) associated with the viewer 108, which may receive input from and/or provide output to the viewer 108 in the performance of such functions.

In summary, video player 104 may be designed to handle any of a wide array of video inputs 102 and generate one or more corresponding video outputs 106, catering to local and/or streaming use cases. Whether the content is pre-recorded or live, video player 104 ensures the content is processed and delivered in a manner that provides a seamless viewing experience to the end user.

The viewer 108 may provide viewer feedback 110 to the system 100 (FIG. 2, operation 204). In general, an instance of the viewer feedback 110 represents feedback of the viewer 108 that is associated with a particular corresponding portion of the video input 102 and/or a particular corresponding portion of the video output 106. (Any reference herein to the viewer feedback 110 in connection with the video input 102 should be understood to be equally applicable to the viewer feedback 110 in connection with the video output 106, and vice versa.) For example, an instance of the viewer feedback 110 may include data representing anyone or more of the following:

Feedback content, such as text, audio, and/or video content. Such feedback content may, for example, represent an opinion, reaction, emotion, sentiment, annotation, suggestion, or instruction of the viewer 108 associated with the portion of the video input 102 that is associated with the instance of the viewer feedback 110.

A temporal component (e.g., a temporal parameter value or values, e.g., frame number(s), start time, and/or end time) associated with the instance of the viewer feedback 110. The temporal component may correspond to less than all of the video input 102.

A spatial component (e.g., a spatial parameter value or values, e.g., a spatial region within one or more frames of the video input 102) associated with the instance of the viewer feedback 110. The spatial component may represent less than all of a video frame in the video input 102, such as a single pixel, or a subset of the pixels in a video frame in the video input 102.

As will be described in more detail below, the viewer 108 may provide multiple instances of the viewer feedback 110 over time. As a result, operation 204 in FIG. 2 may be performed multiple times, once for each instance of the viewer feedback 110. Such instances of the viewer feedback 110 may differ from each other in any of a variety of ways. For example, any two instances of the viewer feedback 110 may differ from each other in any one or more of their feedback content, their temporal parameter values, and/or their spatial parameter values. In this way, the viewer 108 may provide a variety of different feedback on different portions (temporally and spatially) of the video input 102.

The viewer 108 may provide any particular instance of the viewer feedback 110 at any of a variety of times, and may provide different instances of the viewer feedback 110 at different times. For example, while the video player 104 is playing the video input 102 (e.g., generating the video output 106), the viewer 108 may provide different instances of the viewer feedback 110 at different times during such playback. The viewer 108 may provide the viewer feedback 110 before the video player 104 plays the video input 102, while the video player plays the video input 102, or after the video player 104 plays the video input 102.

The content of the temporal component of the viewer feedback 110 may or may not be based on the time at which the viewer 108 provided the viewer feedback 110. For example, when the system 100 receives the viewer feedback 110, the system 100 may automatically identify a time associated with the viewer feedback 110, such as by identifying the clock time at which the viewer feedback 110 is received from the viewer 108 or a current playback time (e.g., current frame) within the video input 102 and/or the video output 106 at the time the viewer feedback 110 is received. Alternatively, for example, the viewer 108 may provide input specifying a time or range of times (e.g., "1:30" or "Scene 2"), in response to which the system 100 may store that time or range of times, or a time or range of times derived from the user input, within the temporal component of the viewer feedback 110, independently of the current playback time (if any) of the video input 102 and/or the video output 106.

The temporal component of an instance of the viewer feedback 110 may, for example, specify a single time (e.g., an offset from the start time of the video input 102 and/or the video output 106 (measured in a temporal unit such as milliseconds or seconds), or a frame number), a range of times, or the entire timespan of the video input 102 and/or the video output 106.

The system 100 may generate and store values of the data within each instance of the viewer feedback 110 in any of a variety of ways. For example, the viewer 108 may provide the feedback content of an instance of the viewer feedback 110 by using any of a variety of input devices (e.g., a keyboard, touchscreen, or microphone) to provide input to the system 100, such as by typing text or speaking, in response to which the system 100 may store such text or audio (and/or text automatically transcribed from such audio) as the feedback content of the instance of the viewer feedback 110.

The system 100 may, for example, automatically generate and store the temporal parameter value(s) of an instance of the viewer feedback 110 by identifying those temporal parameter value(s) based on the portion of the video input 102 that is rendered (e.g., displayed) or otherwise is at a current playback position at the time the viewer 108 provides the viewer feedback 110. For example, the system 100 may store, as the temporal parameter value of an instance of the viewer feedback 110, the current frame or current playback time of the video input 102 at the time the viewer 108 provides the instance of the viewer feedback 110.

The system 100 may, for example, store the spatial parameter value(s) of an instance of the viewer feedback 110 based on input received from the viewer 108. For example, the viewer 108 may click on, tap on, or otherwise select a subset of a currently-rendered frame of the video input 102, in response to which the system 100 may store information representing that subset of the currently-rendered frame as the spatial parameter value(s) of the instance of the viewer feedback 110. Alternatively, for example, the system 100 may automatically identify the spatial parameter value(s) of an instance of the viewer feedback 110 in any of a variety of ways, such as by performing gaze tracking on the viewer 108 to identify a subset of the currently-rendered frame to which the viewer 108's gaze is directed at the time the viewer 108 provides the viewer feedback 110 to the system 100.

The viewer 108 may, for example, provide the viewer feedback 110 spontaneously at any time, i.e., not in response to a prompt from the system 100. The viewer 108 may, for example, spontaneously initiate such viewer feedback 110 by typing or speaking, such as by first pausing and/or clicking on the video output 106 (e.g., a particular location or region of the video output 106).

Alternatively, the system 100 may, at one or more times during playback of the video input 102, generate output which prompts the viewer 108 to provide feedback (FIG. 2, operation 206). Such output is referred to herein as a "prompt," not to be confused with a prompt that is provided by a user as input to a chatbot or large language model. The system 100 (e.g., the video input 102) may, for example, generate data representing one or more times (and one or more corresponding prompts). The system 100 may use such data to generate one or more prompts at the specified time(s) during rendering of the video output 106. In response to any such prompt, the viewer 108 may provide a corresponding instance of the viewer feedback 110.

The content of the viewer feedback 110 may range in the specificity with which it describes any changes to be made to the video input 102. For example, the viewer feedback 110 may include any one or more of the following, which generally progress on a continuum from non-specific to specific feedback in relation to changes to be made to the video input 102:

an opinion about the video input 102;
a general suggestion for a change to the video input 102 (e.g., to make it longer, shorter, or to include or convey more or less of a particular characteristic);
a specific suggestion for a change to the video input 102 (e.g., for a character to perform a specific action).

Examples of types of feedback 110 that the viewer 108 may provide include:

"one touch" feedback, in which the viewer 108 selects (e.g., clicks or taps) on a particular location onscreen (e.g., on a rendering of the video output 106);
emoji feedback, in which the viewer 108 provides an emoji as input to indicate the viewer 108's feeling at a particular time during rendering of the video output 106;
comment feedback, in which the viewer 108 provides an open-ended comment (in the form of text) at a particular time during rendering of the video output 106;
numeric feedback, in which the viewer 108 provides a numeric (e.g., star) rating (e.g., on a scale of between one and five) at a particular time during rendering of the video output 106;
choice feedback, in which the viewer 108 chooses from among a plurality of choices (e.g., a plurality of graphical elements, such as images);
slider feedback, in which the viewer 108 uses a slider to provide a value representing the viewer 108's evaluation of the video output 106 at a particular time during rendering of the video output 106.

The viewer feedback 110 may include interactive annotation feedback in which the viewer 108 creates visual annotations directly on the video output 106. Such annotations may include, for example, drawing feedback, in which the viewer 108 uses drawing tools to create freeform visual elements directly on frames of the video output 106. For example, the viewer 108 may draw arrows, circles, or other shapes to highlight specific areas or indicate motion paths within the video output 106. As another example, such annotations may include marker feedback, in which the viewer 108 places predefined visual markers or indicators at specific spatial locations within frames of the video output 106. Such markers may, for example, identify objects, characters, or other elements of interest within the video output 106. As yet another example, such annotations may include highlight feedback, in which the viewer 108 creates highlighted regions within frames of the video output 106 to draw attention to specific spatial areas. The highlighted regions may correspond to particular objects, characters, or scenes identified in the extracted video data 124. As yet another example, such annotations may include motion path feedback, in which the viewer 108 creates visual indicators showing suggested paths of motion for objects or characters within the video output 106. Such motion path feedback may be associated with specific temporal ranges within the video output 106. The system 100 may store any such interactive annotation feedback as part of the viewer feedback 110, including both the visual elements created by the viewer 108 and associated temporal and spatial data identifying when and where within the video output 106 the annotations were created. The conversation module 116 may analyze such interactive annotation feedback, in conjunction with the extracted video data 124 and external data 120, to generate subsequent feedback prompts 118 that reference or build upon the viewer's annotations.

The viewer feedback 110 may include voice/audio feedback in which the viewer 108 provides auditory input that is synchronized with or associated with the video output 106. Such audio feedback may include, for example, voice comment feedback, in which the viewer 108 speaks comments that are recorded and synchronized with specific temporal positions within the video output 106. The system 100 may store both the recorded audio and a text transcription of the audio as part of the viewer feedback 110. As another example, voice/audio feedback may include audio reaction feedback, in which the viewer 108 provides spontaneous auditory reactions (such as laughter, gasps, or other non-verbal responses) that are recorded and associated with specific moments in the video output 106. Such reactions may be analyzed by the video analysis module 122 to extract sentiment data representing the viewer's emotional response. As yet another example, the voice/audio feedback may include voice annotation feedback, in which the viewer 108 provides spoken descriptions or explanations that are associated with specific spatial regions within frames of the video output 106. For example, the viewer 108 may describe particular objects, characters, or scenes identified in the extracted video data 124. The conversation module 116 may analyze any such voice/audio feedback, such as by converting it to text and analyzing it in conjunction with the extracted video data 124 and external data 120, to generate subsequent feedback prompts 118 that reference or build upon the viewer's audio input.

The viewer feedback 110 may include comparative feedback in which the viewer 108 provides evaluations that compare different aspects or versions of the video output 106. Such comparative feedback may include, for example, A/B comparison feedback, in which the viewer 108 compares and provides feedback on different versions or variations of scenes within the video output 106. For example, the viewer 108 may evaluate alternative takes of the same scene, comparing aspects such as pacing, performance, or technical elements identified in the extracted video data 124. As another example, such comparative feedback may include side-by-side rating feedback, in which the viewer 108 provides numeric ratings, slider values, or other quantitative evaluations comparing multiple versions of video content displayed simultaneously. The system 100 may store such ratings along with temporal data identifying the specific portions of the video output 106 being compared. As yet another example, such comparative feedback may include preference selection feedback, in which the viewer 108 chooses between multiple presented options or alternatives within the video output 106. Such preferences may be associated with specific objects, characters, scenes, or other elements identified in the extracted video data 124. The system 100 may store any such comparative feedback as part of the viewer feedback 110, including both the viewer's comparative evaluations and associated temporal and spatial data identifying which portions of the video output 106 were compared. The conversation module 116 may analyze such comparative feedback in conjunction with the extracted video data 124 and external data 120 to generate subsequent feedback prompts 118 that explore the viewer's preferences and reasoning behind their comparisons.

The spatial data within the viewer feedback 110 may represent spatial locations within the video output 106 in any of a variety of forms, including any one or more of the following:

Single-pixel feedback, in which the spatial data identifies a single pixel within a frame of the video output 106. For example, the viewer 108 may click on or tap a specific pixel to provide precise location-based feedback.

Region-based feedback, in which the spatial data identifies a subset of pixels within a frame of the video output 106. Such regions may correspond to specific objects, characters, or other elements identified in the extracted video data 124.

Full-frame feedback, in which the spatial data encompasses an entire frame of the video output 106. This allows the viewer 108 to provide feedback about all visual elements within a particular frame.

The viewer 108 may provide input specifying such spatial data in any of a variety of ways, including any one or more of the following:

Direct selection, in which the viewer 108 clicks on, taps on, or otherwise selects a subset of a currently-rendered frame of the video output 106. The system 100 may store information representing that selected subset as the spatial parameter value(s) of the viewer feedback 110.

Gaze tracking, in which the system 100 automatically identifies the spatial parameter value(s) by performing gaze tracking on the viewer 108 to identify a subset of the currently-rendered frame to which the viewer 108's gaze is directed at the time the viewer 108 provides the viewer feedback 110.

Interactive drawing, in which the viewer 108 uses drawing tools to create freeform shapes or selections that define spatial regions within the video output 106. The system 100 stores the coordinates or boundaries of such drawn regions as spatial parameter values.

The system 100 may store any such spatial data as part of the viewer feedback 110, allowing the conversation module 116 to generate subsequent feedback prompts 118 that reference specific spatial locations or regions identified by the viewer 108.

Any two or more of the types of feedback above may be combined with each other within a particular instance of the viewer feedback 110. For example, an instance of the viewer feedback 110 may include both comment and star feedback, both comment and slider feedback, or both comment and emoji feedback.

The system 100 enables a variety of combinations of temporal and spatial feedback components that provide precise context for viewer interactions. For example, the viewer feedback 110 may include voice annotation feedback that combines spoken comments with precise spatial locations within the video output 106. In this type of feedback, the viewer 108 provides spoken descriptions or explanations that are synchronized with specific visual elements in the video output 106. The temporal component may include specific timestamps indicating exactly when each spoken comment is provided, while the spatial component may include single-pixel selections or small bounded regions that identify the exact objects, characters, or features being discussed.

The viewer feedback 110 may also include emotion-tracking feedback that combines sentiment indicators with precise spatial-temporal data. As viewers provide emotional reactions through emoji selections or other indicators, the system 100 may capture both the exact timestamp of each reaction and the specific screen coordinates or regions that triggered the response. This allows the system 100 to maintain detailed records of which visual elements evoke particular emotional responses at specific moments.

Additionally, the viewer feedback 110 may include motion path feedback that combines temporal ranges with spatial trajectories. When suggesting how objects or characters should move within scenes, viewers can specify both a duration (through start and end times) and a spatial path (through a series of coordinates or regions across multiple frames). The system 100 may maintain the relationship between these temporal and spatial components, enabling precise tracking of suggested motion paths over time.

These combined temporal-spatial feedback capabilities enable the system to capture and process viewer interactions with precision, maintaining exact relationships between feedback content and specific moments and locations within the video output 106. This granular approach to feedback collection and processing fundamentally differentiates the system 100 from platforms that only support basic commenting or reaction features.

Any instance of the feedback prompt 118 may, for example, prompt the viewer 108 for a particular type of viewer feedback, such as any one of the particular types of viewer feedback listed above. For example, a particular instance of the feedback prompt 118 may prompt the viewer 108 for "one touch" feedback, emoji feedback, comment feedback, star feedback, slider feedback, or any combination thereof. Any instance of the feedback prompt 118 which prompts the viewer 108 to provide a comment may, for example, prompt the viewer 108 to provide an open-ended comment, or prompt the viewer 108 for a specific type of comment, such as by providing the viewer 108 with a question and asking the viewer 108 to provide an answer to that question.

Although the viewer feedback 110 may include any feedback content, temporal data, and/or spatial data, some particular examples of such viewer feedback will now be described. For example, the viewer feedback 110 may include voice annotation feedback that combines spoken comments with precise spatial locations within the video output 106. In this type of feedback, the viewer 108 provides spoken descriptions or explanations that are synchronized with specific visual elements in the video output 106. The temporal component of such voice annotation feedback may include specific timestamps indicating exactly when each spoken comment is provided. The system 100 may capture and stores these temporal parameters to precisely associate each voice annotation with the moment in the video output 106 that prompted the viewer 108's comment. The system 100 may store both the original audio recording and a text transcription synchronized with these timestamps. In this embodiment, the spatial component may include single-pixel selections or small bounded regions that identify the exact objects, characters, or features being discussed in the voice annotation. As the viewer 108 provides spoken feedback, they may click, tap, or otherwise select the specific visual elements they are commenting on, allowing the system 100 to capture precise spatial coordinates or regions within the frame. These spatial selections may correspond to objects or characters identified in the extracted video data 124. The conversation module 116 may analyze such voice annotation feedback by processing both the audio content and its associated spatial-temporal data to generate subsequent feedback prompts 118 that reference specific elements the viewer has commented on. The system 100 may store all components of the voice annotation feedback including the audio recording, transcribed text, timestamp data, and precise spatial coordinates—as part of the viewer feedback 110.

As another example, the viewer feedback 110 may include gaze-tracked emotional reaction feedback that combines automatic gaze tracking with emotional responses to the video output 106. In this type of feedback, the viewer 108 provides emotional reactions through emoji selections or other sentiment indicators while the system 100 automatically tracks their gaze position. The temporal component of such gaze-tracked reaction feedback may include automatically captured timestamps indicating exactly when each emotional reaction occurs. The system 100 may capture and store these temporal parameters to precisely associate each reaction with the specific moment in the video output 106 that triggered the viewer's emotional response. This temporal data allows the system to analyze patterns in how different scenes or elements evoke particular reactions. The spatial component may include automatically tracked gaze coordinates or regions that identify exactly what the viewer 108 was looking at when they had each emotional reaction. The system 100 may perform gaze tracking to identify the subset of the currently-rendered frame to which the viewer 108's gaze is directed, capturing precise spatial data about which visual elements triggered specific reactions. These gaze-tracked regions may correspond to objects, characters, or other elements identified in the extracted video data 124. The conversation module 116 may analyze such gaze-tracked reaction feedback by processing both the emotional content and its associated spatial-temporal data to generate subsequent feedback prompts 118 that explore the viewer 108's reactions to specific elements. The system 100 may store all components of the gaze-tracked reaction feedback—including the emotional indicators, timestamp data, and gaze tracking coordinates—as part of the viewer feedback 110.

As yet another example, the viewer feedback 110 may include interactive object tagging feedback that combines text labels or categories with object tracking across frames of the video output 106. In this type of feedback, the viewer 108 creates and applies descriptive tags or categorical labels to specific objects, characters, or elements within the video output 106. The temporal component of such object tagging feedback may include duration data representing the timespan during which each tagged object appears in the scene. The system 100 may capture and store these temporal parameters to track how long each tagged element remains visible and relevant within the video output 106. This temporal tracking allows the system to maintain tag associations even as objects move or change throughout a scene. The spatial component may include bounded regions that track the movement and position of tagged objects across multiple frames. As tagged objects move within the video output 106, the system 100 may update the spatial coordinates or regions to maintain accurate associations between tags and their corresponding visual elements. These tracked regions may correspond to objects, characters, or other elements identified in the extracted video data 124. The conversation module 116 may analyze such object tagging feedback by processing both the tag content and its associated spatial-temporal tracking data to generate subsequent feedback prompts 118 that reference specific tagged elements. The system 100 may store all components of the object tagging feedback—including the text labels, duration data, and tracked spatial coordinates—as part of the viewer feedback 110.

Although FIG. 2 shows receipt of the viewer feedback 110 (operation 204) as occurring before prompting of the viewer 108 for the viewer feedback 110 (operation 206), this is merely an example and does not constitute a limitation of the present invention. As disclosed elsewhere herein, the system 100 (e.g., the conversation module 116) may first prompt the viewer 108 (operation 206), in response to which the viewer 108 may provide the viewer feedback 110. More generally, instances of operations 204 and 206 in FIG. 2 may occur repeatedly and in any sequence, not merely in the particular sequence shown in FIG. 2. Furthermore, the viewer 108 may provide any particular instance of the viewer feedback 110 spontaneously, i.e., not in response to an instance of the feedback prompt 118. As this implies, certain embodiments of the method 200 may omit prompting of the viewer 108 (operation 206), at least in connection with certain instances of the viewer feedback 110. As a particular example, the system 100 may provide a first instance of the feedback prompt 118 to the viewer 108 (operation 206), in response to which the viewer 108 may provide a first instance of the viewer feedback 110, and the viewer 108 may then provide a second instance of the viewer feedback 110 even though the system 100 has not provided another instance of the feedback prompt 118 to the viewer 108.

The system 100 includes a viewer feedback storage module 112, which receives each instance of the viewer feedback 110 and stores that instance of the viewer feedback 110 (and/or data derived therefrom) in stored viewer feedback 114. As this implies, as the viewer 108 provides multiple instances of the viewer feedback 110 over time, the system 100 updates the stored viewer feedback 114 to contain or otherwise reflect those multiple instances of the viewer feedback 110.

Although the description of the system 100 so far has referred to a single video input 102, a single video player 104, a single video output 106, and a single viewer 108, the system 100 may include more than one instance of any one or more of these. For example:

The system 100 may include multiple instances of the video input 102, e.g., multiple stored video files and/or multiple live video streams, which the video player 104 may render, either sequentially or in parallel. As one example, the viewer 108 may use the video player 104 to watch multiple videos (e.g., to render multiple instances of the video input 102) over time, in which case any of the functions disclosed herein may be performed in connection with such renderings of multiple videos.

The system 100 may include multiple instances of the video player 104, such as on multiple computing devices. Each such instance of the video player 104 may perform any of the functions disclosed herein in connection with the video player 104, and such multiple instances of the video player 104 may performs the functions disclosed herein sequentially or in parallel with each other.

As the above implies, the system 100 may include multiple instances of the video output 106, which may include, for example, multiple instances of the video output 106 generated based on the same instance of the video input 102 (e.g., if multiple viewers watch the same instance of the video input 102, or if the same viewer 108 watches the same instance of the video input 102 multiple times) and/or multiple instances of the video output 106 generated based on multiple instances of the video input 102 (e.g., if different instances of the video input 102 are rendered, either sequentially or in parallel with each other).

The system 100 may include multiple instances of the viewer 108, e.g., multiple people who play the role of the viewer 108. Each such person may perform any of the functions disclosed herein in connection with the viewer 108, and multiple such people may perform such functions in serial or in parallel with each other. As this implies, different instances of the viewer feedback 110 may be received from and associated with the same or different instance of the viewer 108. The system 100 may store, in each such instance of the viewer feedback 110 (and in the corresponding data in the stored viewer feedback 114) data identifying the instance of the viewer 108 (e.g., human user) from which the viewer feedback 110 was received. As this implies, the stored viewer feedback 114 may include viewer feedback from one or a plurality of instances of the viewer 108.

The system 100 may also include extracted video data 124, which may include any of a variety of data extracted from the video input 102 and/or the video output 106. The system 100 may include a video analysis module 122, which may generate the extracted video data 124 based on the video input 102 and/or the video output 106. The extracted video data 124 may for example, contain data representing one or more of the following:

Objects: The video analysis module 122 may identify objects within a scene, such as furniture, vehicles, and buildings, such as by using one or more object recognition algorithms.

Characters: The video analysis module 122 may, for example, use facial recognition technology to identify and track characters or people throughout a video.

Motion and Trajectories: The video analysis module 122 may, for example, track the movement of objects and/or characters, allowing for the analysis of their trajectories over time.

Scene Changes: The video analysis module 122 may, for example, detect cuts and transitions between scenes, identifying when one shot ends and another begins.

Text and Symbols: The video analysis module 122 may use text recognition (OCR) to extract written information, such as signs or subtitles, and use symbol recognition to identify logos or other significant symbols within the video.

Activities and Actions: The video analysis module 122 may identify specific activities or actions being performed by characters, such as running, jumping, or interacting with other characters or objects.

Sentiment and Emotion: The video analysis module 122 may, for example, analyze facial expressions and body language to infer the mood or emotion of the characters.

Scene Classification: The video analysis module 122 may classify the overall setting or environment of a scene (e.g., urban, rural, indoor, outdoor).

Color Analysis: The video analysis module 122 may extract the dominant colors or the color palette used in a scene.

Audio Analysis: The video analysis module 122 may, for example, extract information from the audio track of the video input 102, such as by detecting speech, music genres, or environmental sounds that can provide context about the scene.

Lighting and Effects: The video analysis module 122 may, for example, extract information about the lighting conditions, such as shadows and highlights, or special effects used in the scene.

The video analysis module 122 may employ any of a variety of technologies to generate the extracted video data 124. For computer vision processing, the module 122 may, for example, utilize any one or more of the following: object detection and recognition algorithms to identify and track objects within scenes; facial recognition systems to identify and track characters throughout the video; scene segmentation algorithms to detect and classify different environments; motion tracking systems to analyze trajectories of objects and characters; optical character recognition (OCR) for extracting text and symbols.

For audio content analysis, the module 122 may incorporate any one or more of the following: speech recognition systems for converting spoken dialogue to text; audio classification algorithms for identifying music, environmental sounds, and other audio elements; voice recognition for identifying specific speakers; audio sentiment analysis to detect emotional tone in speech.

The module 122 may leverage various machine learning models, such as any one or more of the following: convolutional neural networks for visual feature extraction; recurrent neural networks for temporal pattern analysis; transformer models for understanding scene context and relationships; deep learning models trained on video understanding tasks.

For specialized analysis capabilities, the module 122 may employ any one or more of the following: lighting analysis algorithms to detect and characterize lighting conditions; color analysis systems to extract color palettes and dominant colors; special effects detection algorithms to identify and analyze visual effects; action recognition systems to classify specific activities and behaviors.

To handle real-time processing requirements, the module 122 may utilize any one or more of the following: stream processing systems for analyzing live video input; parallel processing frameworks for simultaneous analysis of multiple video features; buffer management systems for handling continuous video streams.

The video analysis module 122 may employ these technologies individually or in combination to generate the extracted video data 124 to include objects, characters, scenes, motion paths, text, activities, emotions, and other elements identified within the video input 102 and/or video output 106.

The system 100 may also include any of a variety of external data 120, which may or may not relate to the video input 102. Examples of such external data 120 include:

Cast and Crew Information: Names of actors, directors, writers, and other crew members, along with their filmography, biographies, and trivia.

Character Backstories: Details about the characters within the video, including their backstory and development over time, especially in TV series.

Scene-Specific Information: Data tied to specific scenes, such as the location where the scene was shot, the music playing in the background, and any relevant context or trivia.

Music Identification: Titles and artists of songs in the soundtrack, sometimes with a direct option to listen to the track or explore the artist's other work.

References to Other Works: Information about references or homages to other movies, TV shows, or literary works that appear in the video.

Behind-The-Scenes Content: Details about the production of the scene or episode, including challenges faced during shooting, special effects used, or ad-libs by the actors.

Historical and Cultural Context: Facts or explanations about the time period, cultural context, or real-life events that are relevant to the content.

Factual Information: Data about real-life subjects that are portrayed or mentioned in the video, such as scientific concepts, historical figures, or geographic locations.

Trivia: Fun facts related to the video, including easter eggs, continuity errors, or notable achievements (like awards won by the film or show).

Source Material Information: If the video is based on pre-existing material, like a book or a play, information about the source and comparisons between the adaptation and the original.

Viewer Interaction Data: Aggregated data on how viewers interact with the video, popular scenes, or frequently asked questions.

Transcript: A manually-written and/or automatically-generated transcript of some or all of the current video.

Brand: Information about the brand, producer, studio, and/or copyright owner of the current video.

Viewer Data: Information one or more instances of the viewer 108, such as unique IDs and demographic information associated with any such instance(s) of the viewer 108.

User-Supplied Contextual Data: Data supplied by one or more users (e.g., the person or team who uploads and sets up the video input 102) to supplement automatically-collected/detected information.

The external data 120 may include, for example, feedback received from one or more instances of the viewer 108 on one or more instances of the video input 102 by systems other than the system 100. For example, the external data 120 may include feedback provided to one or more social networking systems (e.g., Facebook, Instagram) and/or one or more video hosting services (e.g., YouTube, Vimeo) by one or more instances of the viewer 108. The system 100 may, for example, make use of any such externally-received feedback in any of the ways disclosed herein in connection with the viewer feedback 110.

The system 100 may use the user-supplied contextual information as part of the external data 120 used to generate the feedback prompt 118. This contextual information may include, for example, supplementary data provided by users who set up the video input 102 for use, such as content creators or system administrators. The user-supplied contextual information allows users to provide arbitrary or unstructured information about the video input 102 that may not be automatically detectable through the system 100's video analysis capabilities.

For example, although the system 100 may automatically extract various types of video data using the techniques disclosed herein, there may be important contextual aspects of the video input 102 that require or benefit from human input to properly understand and process. Users may provide information about the video's intended audience, viewing context, content sensitivities, temporal relevance, or other characteristics that influence how the system generates and provides instances of the feedback prompt 118.

The system 100 may incorporate this user-supplied contextual information in addition to other forms of the external data 120 when using the machine learning model to generate instances of the feedback prompt 118. This allows the system 100 to consider both automatically detected features of the video input 102 and human-provided context when engaging in conversations with the viewer 108. The ability to process and utilize such unstructured contextual information enables the system 100 to generate more informed and appropriate feedback prompts that align with the video's intended purpose and viewing context.

The user-supplied contextual information may be take the form of natural language text statements that describe important context about the video input 102. For example, users may provide statements such as "Viewers are expected to complete a pre-video survey to understand the concepts introduced here", which informs the system about prerequisite activities. Users may specify viewing context through statements like "This video is part of a live virtual conference, and viewers are expected to discuss it in breakout groups immediately afterward." The system 100 may also receive statements about intended audience and usage restrictions, such as "This video is intended only for internal team training on our proprietary system."

When generating feedback prompts 118, the conversation module 116 may provide such natural language contextual statements to its machine learning model, such as a large language model. By processing this natural language context, possibly in addition to the viewer feedback 110 and other external data 120, the machine learning model may generate feedback prompts that are more appropriately tailored to the video input 102's intended purpose, audience, and viewing context.

Although certain information is described above as being contained in the extracted video data 124 and certain information is described above as being contained in the external data 120, any of the data described as being contained in the extracted video data 124 may be contained (additionally or alternatively) in the external data 120 and vice versa. In fact, the system 100 may add data (and data derived therefrom) from the external data 120 to the extracted video data 124, and may add data (and data derived therefrom) from the extracted video data 124 to the external data 120.

Similarly, any of the data disclosed herein as being contained in the extracted video data 124 or the external data 120 may (additionally or alternatively) be contained in the video input 102. In fact, the system 100 may add data (and data derived therefrom) from the video input 102 to the extracted video data 124 and/or the external data 120, and may add data (and data derived therefrom) from the extracted video data 124 and/or the external data 120 to the video input 102.

More generally, and as will be described in more detail below, the system 100 may store any of the data disclosed herein for future use by any component(s) of the system 100. For example, the system 100 may store some or all instances of the stored viewer feedback 114, some or all instances of the feedback prompt 118, some or all of the external data 120, and some or all of the extracted video data 124 for future use by any component(s) of the system 100. Any data element stored by the system 100 (e.g., any instance of the viewer feedback 110 stored in the stored viewer feedback 114, any data in the external data 120, or any extracted data in the extracted video data 124) may be tagged with associated metadata, such as corresponding temporal data (e.g., a timestamp, such as a time in the video input 102 to which it corresponds) and/or corresponding spatial data (e.g., a corresponding location in the video input 102 to which it corresponds).

The system 100 also includes a conversation module 116 which may engage in a conversation with (e.g., provide output to and receive input from) the viewer 108. As will be described in more detail below, the conversation engaged in by the conversation module 116 may adapt dynamically to a variety of inputs, including one or more instances of the viewer feedback 110 received from the viewer 108 while the viewer 108 is watching one or more videos (e.g., while the video player 104 is rendering the video input 102 to generate the video output 106).

The conversation module 116 may, for example, generate output referred to herein as a feedback prompt 118 and provide the feedback prompt to the viewer 108 (FIG. 2, operation 206). The feedback prompt 118 may, for example, contain data representing a question, a statement, or a request for feedback from the viewer 108. As in the case of all other outputs provided by the system 100 to the viewer 108, the conversation module 116 may, for example, generate visual and/or auditory output representing the feedback prompt 118 that is perceived by the viewer 108, or the conversation module 116 may provide (e.g., transmit) the feedback prompt 118 to a computing device which generates such visual and/or auditory output. As in the case of all other data disclosed herein, the system 100 may store any instance of the feedback prompt 118 for future use by any component(s) of the system 100, which may include storing metadata associated with that instance of the feedback prompt 118, such as corresponding temporal data (e.g., a time in the video input 102 to which it corresponds) and/or corresponding spatial data (e.g., a corresponding location in the video input 102 to which it corresponds).

The conversation module 116 may generate the feedback prompt 118 based on any of a variety of inputs, such as any one or more of the following, in any combination (FIG. 2, operation 216):

A single instance of the viewer feedback 110, such as the most recent instance of the viewer feedback 110 received from the viewer 108 (FIG. 2, operation 208).

Some or all of the stored viewer feedback 114, such as some or all of the stored viewer feedback 114 associated with a particular conversation, a particular instance of the viewer 108, the current instance of the video input 102, or a plurality of viewers (e.g., in a single conversation or a plurality of conversations).

One or more instances of the video input 102, such as the instance of the video input 102 currently being rendered by the video player 104 and output to the viewer 108 (FIG. 2, operation 210).

One or more instances of the video output 106 (FIG. 2, operation 210).

Some or all of the extracted video data 124 (FIG. 2, operation 212).

Some or all of the external data 120 (FIG. 2, operation 214).

When the conversation module 116 generates the feedback prompt 118 based on one or more instances of the viewer feedback 110, the conversation module 116 may generate the feedback prompt 118 based on any data in such viewer feedback 110, such as its feedback content, its temporal parameter value(s), and/or its spatial parameter value(s).

The conversation module 116 may generate and provide the feedback prompt 118 to the viewer 108 at any of a variety of times, such as:

As quickly as possible in response to the most recent instance of the viewer feedback 110 from the viewer 108. This may include generating and providing the feedback prompt 118 to the viewer 108 in real-time (e.g., within 10 ms, 100 ms, or 500 ms of receiving the viewer feedback 110).

At a predetermined time in the video output 106, such as at a particular frame or time (e.g., a time offset from the beginning of the video output 106) that is specified by data in the video input 102.

At a time that is identified dynamically by the conversation module 116 based on any one or more of its inputs.

In response to receiving the feedback prompt 118, or at any time after the conversation module 116 generates the feedback prompt 118, the viewer 108 may provide a subsequent instance of the viewer feedback 110 to the system 100, in response to which the conversation module 116 may generate a subsequent instance of the feedback prompt 118 that is based at least in part of that subsequent instance of the viewer feedback 110. Such a feedback loop, which may begin either with the viewer 108 providing an instance of the viewer feedback 110 or the conversation module 116 generating and providing an instance of the feedback prompt 118, in which the conversation module 116 generates and provides one or more subsequent instances of the feedback prompt 118 based at least in part on the most recent instance of the viewer feedback 110 received from the viewer 108, and in which the viewer 108 provides at least one subsequent instance of the viewer feedback 110 in response to (or otherwise after) the most recent instance of the feedback prompt 118, may repeat any number of times. This is what is referred to herein as a "conversation" between the viewer 108 and the system 100.

The system 100 may store a record of any such conversation (e.g., in the stored viewer feedback 114), such as by using the viewer feedback storage module 112. For each interaction in the conversation, the system 100 may, for example, store both the viewer feedback 110 and the corresponding feedback prompt 118 that either preceded or followed it. The stored conversation record may include temporal metadata for each interaction, capturing the timing relationships between prompts and responses. This may include, for example, timestamps indicating when each feedback prompt 118 was generated and provided to the viewer 108, as well as when each instance of viewer feedback 110 was received. The system 100 may also store the temporal parameter values associated with specific portions of the video that each interaction references.

The system 100 may store spatial metadata for each interaction in the conversation, such as spatial parameter values that identify specific regions, objects, or characters in the video that were referenced. This allows the system 100 to maintain the spatial context of each prompt and response, particularly for feedback types like motion path annotations, voice annotations with precise locations, or gaze-tracked reactions.

The stored conversation may take various forms, including: sequential records of text-based interactions; synchronized audio recordings of voice annotations alongside their corresponding prompts; visual records showing spatial selections and annotations overlaid on video frames; and multi-modal conversation records that combine text, audio, visual elements, and their associated metadata. The system 100 may store data identifying which viewer participated in each interaction, allowing it to maintain separate conversation records for different viewers.

The conversation module 116 may access any stored conversation record to analyze interaction patterns, generate more contextually relevant subsequent prompts, and maintain continuity across multiple viewing sessions. The system may store some or all components of these conversations for future use by any component of the system 100.

The conversation module 116 may generate the feedback prompt 118 in any of a variety of ways. For example, the conversation module 116 may generate the feedback prompt 118 in whole or in part using a language model (LM), such as a large language model (LLM). For example, the conversation module 116 may generate, based on one or more of its inputs, a prompt (not to be confused with the feedback prompt 118), and provide that prompt as an input to a language model (e.g., an LLM), which may produce an output. The conversation module 116 may provide that output as the feedback prompt 118 or otherwise generate the feedback prompt 118 based, in whole or in part, on that output.

Any language model referred to herein may be of any type disclosed herein. Any language model referred to herein may be contained within the system 100 (e.g., within the conversation module 116) or be external to the system 100 (e.g., external to the conversation module 116), in which case the system 100 (e.g., the conversation module 116) may provide input to and receive output from the language model using a suitable interface, such as an API.

Although the disclosure herein may refer to "a language model," it should be understood that embodiments of the present invention may use a plurality of language models. As a result, any disclosure herein of performing multiple operations using a language model (e.g., generating a first instance of the feedback prompt 118 using a language model and generating a second instance of the feedback prompt 118 using a language model) should be understood to include either using the same language model to perform those multiple operations or to using different language models to perform those multiple operations. Embodiments of the present invention may select a particular language model to perform any operation disclosed herein in any suitable manner, such as automatically or based on input from the viewer 108 which selects a particular language model for use.

Any reference herein to a "language model" should be understood to be equally applicable to other types of models, such as any kind of machine learning model (i.e., a model that was created using machine learning). Examples of such models include, for example, text-to-image models, image-to-text models, text-to-video models, video-to-text models, text-to-audio models, and audio-to-text models. As these examples illustrate, any reference herein to a "language model" may refer to a model which receives an input via any mode(s) (e.g., text, audio (e.g., speech), or video, either individually or in any combination) and which provides an output via any mode(s) (e.g., text, audio (e.g., speech), or video, either individually or in any combination). Any such model may, for example, be a multimodal model. The input mode of any model disclosed herein may be the same as or different from the output mode of such a model. For example, such a model may receive text input and provide text output, or may receive text input and provide video output, merely as two examples. Any operation disclosed herein as being performed using a language model or other type of model may be performed using a single model or a plurality of models, which may include a plurality of models which differ from each other in any of a variety of ways (e.g., in their input mode(s) and/or output mode(s)).

Text data, audio (e.g., speech) data, image data, and video data are examples of different "modes." An instance of the viewer feedback 110 may include data in any one or more modes. The modes of different instances of the viewer feedback 110 may be the same as or differ from each other. For example, a first instance of the viewer feedback 110 may consist solely of text data, and a second instance of the viewer feedback 110 may also consist solely of text data. As another example, a first instance of the viewer feedback 110 may consist solely of text data, and a second instance of the viewer feedback 110 may consist solely of audio data.

An instance of the viewer feedback 110 may include data in any one or more modes. The modes of different instances of the viewer feedback 110 may be the same as or differ from each other. For example, a first instance of the viewer feedback 110 may consist solely of text data, and a second instance of the viewer feedback 110 may also consist solely of text data. As another example, a first instance of the viewer feedback 110 may consist solely of text data, and a second instance of the viewer feedback 110 may consist solely of audio data.

The term "feedback-prompt pair" refers herein to any consecutive instance of the viewer feedback 110 and the feedback prompt 118 in a conversation, whether in the form of an instance of the viewer feedback 110 followed by an instance of the feedback prompt 118, or in the form of an instance of the feedback prompt 118 followed by an instance of the viewer feedback 110. The modes of the instance of the viewer feedback 110 and the instance of the feedback prompt 118 in any particular feedback-prompt pair may be the same as or different from each other. For example, in one feedback-prompt pair, the instance of the viewer feedback 110 may consist solely of text data and the instance of the feedback prompt 118 may also consist solely of text data. As another example, in another feedback-prompt pair, the instance of the viewer feedback 110 may consist solely of text data and the instance of the feedback prompt 118 may consist solely of image data or video data. As yet another example, in another feedback-prompt pair, the instance of the viewer feedback 110 may consist solely of image data or video data, and the instance of the feedback prompt 118 may consist solely of video data.

Any language model disclosed herein may (unless otherwise specified) include one or more language models, such as any one or more of the following, in any combination:
- a unigram language model;
- an n-gram language model;
- an exponential language model;
- a generative language model;
- an autoregressive language model; and
- a neural network language model.

Any language model disclosed may, unless otherwise specified, include at least 1 billion parameters, at least 10 billion parameters, at least 100 billion parameters, at least 500 billion parameters, at least 1 trillion parameters, at least 5 trillion parameters, at least 25 trillion parameters, at least 50 trillion parameters, or at least 100 trillion parameters.

Any language model disclosed herein may, unless otherwise specified, have a size of a least 1 gigabyte, at least 10 gigabytes, at least 100 gigabytes, at least 500 gigabytes, at least 1 terabyte, at least 10 terabytes, at least 100 terabytes, or at least 1 petabyte.

Any language model disclosed herein may, for example, include one or more of each of the types of language models above, unless otherwise specified. As a particular example, any language model disclosed herein may, unless otherwise specified, be or include any one or more of the following language models, in any combination:
- any language model in the GPT-n series of language models (such as GPT-1, GPT-2, GPT-3, or GPT-4) available from OpenAI Incorporated of San Francisco, California;
- any version of the Language Model for Dialogue Applications (LaMDA), Generalist Language Model (GLaM), Pathways Language Model (PaLM), or Gemini language models available from Google LLC of Mountain View, California;
- any version of the Gopher language model, available from DeepMind Technologies of London, United Kingdom;
- any version of the Turing-NLG (Turing Natural Language Generation) language model, available from Microsoft Corporation of Redmond, Washington;
- any version of the Megatron Language Model (Megatron-LM), available from Nvidia Corporation of Santa Clara, California; and
- any version of the Large Language Model Meta AI (LLaMA), available from Meta Platforms, Inc. of Menlo Park, California.

As described above, the video input 102 may, for example, be or include static data, such as a video file (e.g., a video file that was created using a camera and which includes video data that was captured using the camera). As further described above, the video input 102 may, for example, be or include a live video stream (e.g., a live video stream that includes video data captured using a camera). As yet another example, the video input 102 may, for example, be or include video data generated by the system 100, such as video data generated using one or more models, such as a text-to-video model. As this implies, such generated video data may be generated by the system 100 without using a camera or any other image capture or video capture device which captures visual data from the real world. Such video data may, for example, be generated by the conversation module 116 based on any of the inputs to the conversation module 116 disclosed herein. For example, such video data may be generated by the conversation module 116 without human intervention (after receiving the viewer feedback 110), such as by using a trained model (e.g., a text-to-video model).

As one example, the conversation module 116 may generate, based on any one or more of its inputs, video generation output 126. The system 100 may also include a video generation module 128, which may receive the video generation output 126 and, based on the video generation output 126, generate and/or modify the video input 102. The video generation output 126 may take any of a variety of forms. For example, the video generation output 126 may be or include text, which the video generation module 128 may use to generate and/or modify the video input 102 (such as by using a text-to-video model). Text in the video generation output 126 may include and/or be derived from the feedback prompt 118. As another example, the video generation output 126 may be or include video data (e.g., video data generated using a text-to-video model), in which case the video generation module 128 may update the video input 102 based on such video data, such as by adding the video data to the video input 102. Note that the video generation module 128 is optional and that the conversation module 116 may, for example, directly modify the video input 102.

The video generation module 128 may, for example, generate video data and add that generated video data to existing video data in the video input 102. As another example, the video generation module 128 may modify video data in the video input 102 based on the video generation output 126. As yet another example, the video generation module 128 may remove video data from the video input 102. The video generation module 128 may perform such operations in combination with each other. For example, the video generation module 128 may generate video data and replace existing video data in the video input 102 with the generated video data.

The video input 102 may solely consist of video data generated by the system 100 (e.g., by the conversation module 116 and/or the video generation module 128). Alternatively, for example, the video input 102 may include both video data that was not generated by the system 100 (e.g., video data generated using a camera outside of the system 100) and video data that was generated by the system 100. As one example, the video input 102 may initially include only video data that was not generated by the system 100 (e.g., video data generated using a camera outside of the system 100), and the system 100 may subsequently generate and add video data to the video input 102, as a result of which the video input 102 includes both non-system-generated (e.g., camera-generated) and system-generated video data.

The conversation module 116 may generate the video generation output 126 at any of a variety of times and based on any of a variety of data. For example, the conversation module 116 may generate the video generation output 126 based on and in response to the feedback prompt 118. As another example, the conversation module 116 may generate the video generation output 126 based on and in response to the viewer feedback 110. As yet another example, the conversation module 116 may generate the video generation output 126 based on and in response to the extracted video data 124, such as based on and in response to data in the extracted video data 124 which indicates that a new or changed object has been detected in the video output 106.

Any revisions made to the video input 102 based on the viewer feedback 110 may be made in any of a variety of ways. For example, the system 100 (e.g., the conversation module 116) may edit the video input 102 automatically based on the viewer feedback 110 in any of the ways disclosed herein. As another example, the viewer 108 may directly edit the video input 102, which may include bypassing some or all of the system 100 to perform such an edit, such as by using a video editing application outside of the system 100 to perform such an edit. As yet another example, a user other than the viewer 108 (e.g., the original creator of the video input 102) may directly edit the video input 102, which may include bypassing some or all of the system 100 to perform such an edit, such as by using a video editing application outside of the system 100 to perform such an edit. Any such edits may be performed immediately or essentially immediately (e.g., in real-time) in response to receipt of the viewer feedback 110, or some time may pass between receipt of the viewer feedback 110 and any such editing of the video input 102.

Any revisions made to the video input 102 may be made to one or more instances of the video input 102, e.g., to one or more video files (whether or not those multiple video files represent the same video content). For example, the video generation module 128 may, in response to a single instance of the viewer feedback 110, make the same revision to a plurality of instances of the video input 102 or make different revisions to different instances of the video input 102.

Embodiments of the present invention may be used for a variety of purposes, such as for purposes of:

Content Evaluation
  Content Quality
    Content Improvement: Drive the conversation to gather specific feedback on how to improve the video content, such as pacing, clarity, or entertainment value.
    Entertainment Value: Get viewers to share their favorite humorous or entertaining moments from the video, making the viewing experience more enjoyable.
    Educational Value: Assess the effectiveness of the video as a learning tool, focusing on comprehensibility, retention, and usefulness of the information presented.
    Technical Quality: Obtain feedback on the technical aspects of the video, such as audio quality, visual effects, or editing techniques, in order to refine the overall presentation.
  Message Communication
    Marketing Message Clarity: Assess the clarity and effectiveness of marketing messages within the video. Are viewers understanding and responding to these messages?
    Accessibility: Evaluate the accessibility of the video content, and understand improvements that could make the content more accessible and inclusive.

Audience Analysis
  Audience Engagement
    User Engagement: Encourage viewers to share their thoughts and emotions about the video content, leading to increased engagement and interaction with the video creator.
    Viewer Loyalty: Discover what factors contribute to viewer loyalty, such as consistency, quality of content, or connection with the video creator.
    Emotional Impact: Understand the emotional impact of the video on viewers, including which moments resonated the most and why, in order to create more emotionally engaging content.
    User Retention: Understand the factors that would make viewers watch the video until the end, helping to improve viewer retention rates.
  Audience Understanding
    Viewer Preferences: Understand viewer preferences for video content, such as length, format, style, and frequency of posting.
    Brand Perception: Understand how viewers perceive a brand advertised within the video, and gather insights on brand image, values, and possible improvements.
    Positive Impact: Seek to understand how the video has positively impacted viewers, such as learning something new, improving a skill, or changing a perspective.
    Cultural Representation: Encourage viewers to share their thoughts on the representation of different cultures or groups within the video.

Feedback & Improvement Suggestions
  Video Production Feedback
    In-video Product Feedback: If a product is showcased or reviewed within the video, gather specific feedback about viewers' perceptions of the product, its features, or its use cases.
    Casting Choices: Facilitate discussions about the casting choices, including viewers opinions on the actors performances.
    Design Improvements: Encourage viewers to suggest design enhancements or modifications to the video's aesthetic elements, such as color schemes, costumes, or set designs.
  Content & Narrative Feedback
    Cultural Relevance: Understand the cultural relevance and appropriateness of the video content, and whether it resonates with viewers from diverse backgrounds.

Marketing Performance Evaluation
- Call-to-Action Performance: Determine the effectiveness of a call to action within the video, such as viewers subscribing, purchasing a product, or visiting a website.
- Competitor Comparison: Gather insights about how the video or the featured product service compares with similar content from competitors in the viewers' eyes.
- Marketing Message Clarity: Assess the clarity and effectiveness of marketing messages within the video. Our viewers understanding and responding to these messages?

Creative & Community Engagement
  Creative Engagement
  - Creative Ideas: Invite viewers to share their creative ideas and suggestions for future video topics, themes, or formats that may be appealing to the target audience.
  - Alternative Perspectives: Prompt viewers to retell the story or describe the video content from a different character's perspective from a unique viewpoint.
  - "What if" Scenarios: AI can identify pivotal moments and ask viewers to imagine how the story would change if those moments were altered.
  - Imaginative Problem Solving: Ask viewers how they would creatively solve a problem or challenge presented in the video.
  - Scene Reimagination: Pick a key scene and ask viewers to reimagine it with a different setting or characters (e.g., other roles played by the same actor).
  - Predictive Games: AI can pause at cliffhanger moments and ask viewers to predict what will happen next.

Community Engagement
  - Social Sharing: Identify the factors that would encourage viewers to share the video with their social networks, thus increasing the video's reach and visibility.
  - Value Alignment: Facilitate conversations around the values and principles conveyed in the video, and how these align with the viewers' own values.

Information Discovery
  - Behind-the-Scenes Insights: Use the AI to share interesting production details or trivia at relevant moments in the video, and ask viewers for their reactions.
  - Character Connections: Highlight connections between the characters in the video and characters in other works. Ask viewers to discuss similarities and differences in character portrayal.
  - Trivia Quiz: Use trivia to create engaging quizzes that test viewers knowledge about the video's content or production.
  - Historical Context: If the video is based on or inspired by real events, share this information and ask viewers to discuss the video's depiction of these events.
  - Cast and Crew Discussion: Facilitate discussions about the cast and crew, such as their previous work or their roles in the production of the current video.

Narrative & Character Analysis
  Narrative Analysis
  - Theme Exploration: Facilitate discussions around the themes presented in the video and how viewers interpret them.
  - Genre Appeal: Assess viewers preferences for the genre of the video and how well they believe the video fits within that genre.
  - Story Arc Feedback: Gather feedback on the overall story arc, such as pacing, resolution, and its emotional impact.
  - Plot Engagement: Evaluate how engaged viewers were with the plot, including which plot twists or turns they found most intriguing.

Character Analysis
  - Character Development: Understand viewers perceptions of character development and growth within the video's narrative.
  - Character Likeability: Gauge which characters viewers found most likable or relatable and why.
  - Character Relationships: Facilitate discussions about the dynamics between two characters as understood by the AI.

As the above description makes clear, one use of embodiments of the present invention is to facilitate learning by viewers. For example, when processing educational or instructional video content, the conversation module 116 may engage viewers in structured learning interactions that test comprehension and encourage deeper exploration of concepts.

For example, the system 100 may leverage its understanding of video content to conduct real-time comprehension checks, asking viewers questions about what was presented in the video output 106. The conversation module 116 may analyze both the video content and the viewer 108's responses to generate follow-up questions that probe deeper understanding. This enables interactive learning experiences where viewers can demonstrate and reinforce their grasp of the material through natural conversation.

The system 100's ability to associate feedback with precise temporal and spatial components allows for granular learning interactions. For instance, in an astronomy video, the system 100 may enable viewers to select specific celestial objects or phenomena and engage in detailed discussions about their properties and relationships. Similarly, for language learning applications, the system 100 may facilitate conversations about specific moments in entertainment videos, allowing learners to practice vocabulary and comprehension in context.

The conversation module 116 may generate prompts that encourage creative and generative learning approaches. Rather than simply testing recall, the system 100 may engage viewers in discussions that require applying concepts to new situations or connecting ideas across different parts of the video content. This capability supports both structured educational objectives and more open-ended learning exploration.

For educational content creators, the system 100 may be used to valuable insights into viewer comprehension and engagement. The temporal and spatial precision of feedback allows content creators to identify specific segments or concepts that may require clarification or additional explanation. This data can inform improvements to educational content while maintaining the system 100's dynamic, conversation-based approach to learning.

The system 100 may also integrate external educational context provided through user-supplied contextual information. For example, content creators may specify prerequisite knowledge, learning objectives, or intended educational outcomes, allowing the conversation module 116 to generate more pedagogically appropriate prompts and responses. This ensures that learning interactions align with broader educational goals while maintaining an engaging, conversational format.

The ability of embodiments of the present invention, such as the system 100 of FIG. 1 and the method 200 of FIG. 2, to dynamically engage in conversations with viewers has a variety of advantages, such as the following.

Embodiments of the present invention may facilitate novel viewer experiences by leveraging the advanced video feedback system disclosed herein, thereby enriching user engagement and interactivity. For example, the system 100 may enable real-time viewer reactions, thereby allowing viewers to share and compare their emotional responses with a broader community, effectively creating a virtual communal viewing experience. Additionally, the system 100 may incorporate interactive learning elements, in which viewers may receive educational content linked to the narrative being displayed. Furthermore, the system 100 may provide branching narratives, where the viewer feedback 110 may influence the direction of the storyline, resulting in a unique and personalized viewing experience.

Embodiments of the present invention encompass a sophisticated video feedback system designed to accelerate and enhance the learning process for viewers. For example, by integrating interactive content overlays that can present definitions, explanations, and supplementary information in real-time (such as any of the information in the extracted video data 124, external data 120, and/or feedback prompt 118), the system 100 allows for immediate clarification of concepts presented within the video, thereby reinforcing understanding without disrupting the viewing experience. Furthermore, the system 100 may incorporate adaptive quizzes and summaries at the end of segments or chapters, tailored to the viewer's demonstrated level of understanding, to ensure comprehension and retention of the material.

Embodiments of the present invention may capture and cultivate creative ideas from viewers as they engage with video content. The system 100 may, for example, offer a seamless interface for viewers to input their ideas and feedback at any moment during the video, without interrupting their viewing experience. For example, an integrated idea capture module may allow viewers to voice-record or type in their creative thoughts, suggestions, or interpretations related to the video content, which are then time-stamped and correlated with the specific scene or segment being viewed.

Embodiments of the present invention may implement an advanced video feedback system that establishes a semi-automatic feedback loop for content creators, significantly enhancing the content refinement process. For example, the system 100 may collect viewer reactions, comments, and engagement metrics in real time, utilizing machine learning algorithms to analyze and synthesize this data into actionable insights. For example, the system 100 may automatically identify which segments engage viewers most, based on metrics such as watch time, replay frequency, and interaction rates. Content creators may receive automated suggestions on aspects such as pacing, narrative structure, and topics of high interest. Additionally, sentiment analysis tools within the system 100 may gauge viewer emotions, providing content creators with nuanced understanding of audience reception.

Embodiments of the present invention may incorporate a state-of-the-art video feedback system that can pioneer new forms of audience engagement and foster loyalty for content creators. The system 100 may, for example, enable direct interaction between the audience and content creators through features such as real-time polls, Q&A sessions, and audience-driven story branching, where viewer feedback may directly influence subsequent content creation, making the viewing experience interactive and personalized. The system 100 may also facilitate the formation of viewer communities by allowing audience members to connect based on shared interests highlighted through their interactions and feedback. Such interactive and adaptive features not only enhance the viewer's experience but also create a virtuous cycle of engagement that benefits both the viewers and the content creators, leading to sustained audience loyalty and a stronger creator-audience bond.

Embodiments of the present invention may include an innovative video feedback system that yields deeper audience insights for both viewers and creators, thus enriching the content experience and creation process. The system 100 may, for example, aggregate and analyze detailed engagement data, such as viewing patterns, interaction rates, and emotional responses, using advanced analytics and machine learning algorithms. For creators, this translates into a granular understanding of audience demographics, preferences, and behaviors, enabling them to tailor content to resonate more deeply with their audience. For viewers, the system 100 may provide personalized content recommendations, curate educational or informational material related to viewed content, and suggest community connections based on shared interests, enhancing their discovery and learning journey. The system 100 may also enable creators to track how different audience segments interact with their content over time, providing long-term behavioral insights that may inform future content strategy and development. This bi-directional flow of insights fosters a more informed and engaged audience, and equips creators with the knowledge to produce highly relevant and compelling content, thereby deepening viewer relationships and enhancing the overall value of the content ecosystem.

More generally, embodiments of the present invention pioneer an innovative form of video experience referred to as "generative viewing." This transcends static, one-way video content and empowers fluid, participatory engagement between viewer and creator. The advanced video feedback system facilitates rapid-fire exchanges where audience input directly shapes video in real-time. Viewer reactions trigger dynamic changes to the unfolding narrative—sparking new scenes, characters, and story arcs molded by collective imagination.

No longer passive spectators, audiences become active co-authors liberated to guide content in the directions they find most meaningful. Meanwhile, creators access unfiltered insights into viewer desires, unlocking the ability to craft stories that resonate at deeper emotional levels. United in a shared journey of co-creation, this embodied connection fosters stronger bonds and loyalty.

At its core, generative viewing dismantles conventional barriers between consumption and creation. Feedback flows in a continuous cycle, as commentary and ideas materialize on-screen. The gap between imagination and actualization evaporates through seamless integration of systems and intelligence. This convergence begets truly adaptive video content that keeps pace with viewers and does not grow stale.

Another significant benefit of embodiments of the present invention is that they enable viewers to interact with videos not only at the surface level of the direct video content, but also at the level of content contained within, represented by, and associated with the video, even including content that is not contained with or derivable directly from the video content itself (such as information contained about an actor's personal history, contained in the external data 120, and not otherwise contained within the video input 102 itself). Although viewers may physically interact with a two-dimensional video interface displayed on a screen, the system 100 facilitates engagement with the broader and deeper psychological and narrative space that the video represents.

For example, when watching a video, viewers may interact simultaneously with two spaces: the physical space where they are sitting on a couch watching a screen, and the psychological space of the video's content—such as a narrative story world or an abstract space like astronomical concepts. While traditional systems like YouTube only allow interactions with the video's surface through comments or likes, embodiments of the present invention enable viewers to "dive in" and engage directly with the content itself, and even with external information that is not contained within or derivable solely from the video's content.

For example, in an astronomy video, rather than simply commenting on the video's visual presentation, the system 100 may enable the viewer 108 to engage in conversations about how Einstein and Copernicus relate to each other—accessing the conceptual space that the video represents or relates to. The video serves as a necessary conduit, but the conversation occurs within the psychological space of astronomical concepts and relationships.

The system 100 may achieve this deeper level of engagement by maintaining models of the content beneath the surface—what the conversation module 116 understands about the narrative, concepts, or subject matter being presented. When generating feedback prompts 118, the system 100 may draw on this deeper understanding, rather than merely responding to surface-level video features. This enables the conversation to take place in the psychological space of the content while using the video as a reference point and visualization tool.

Consider the following example of this ability of the system 100. When viewing a dramatic scene in a film, the viewer 108 may tap on a character's face and provide feedback such as, "This character seems really conflicted in this moment." Rather than just responding to the surface-level visual cue of the actor's expression, the system 100 may generate a feedback prompt that draws on multiple layers of information. For example, the conversation module 116 may use the extracted video data 124 to identify any one or more of the following:

The specific character and actor
The character's expressions and actions in the scene
The broader scene context and emotional tone
The system also incorporates external data 120 including:
The character's backstory and development arc
Information about previous scenes featuring this character
Production details about how the scene was filmed
The actor's approach to portraying the character Using this comprehensive understanding, the conversation module 116 may generate a feedback prompt such as: "You've noticed the character's internal conflict. This scene was actually filmed after the climactic confrontation, and the actor mentioned incorporating subtle callbacks to that future scene. What specific details in their performance hint at what's to come?" This type of interaction demonstrates how the system 100 may go "beneath the surface" by moving beyond simple visual analysis to understand narrative and character psychology, incorporating context that is not directly visible in the video, and enabling viewers to engage with the deeper story world rather than just the video presentation. The conversation implemented by the system 100's interactions with the viewer 108 may then evolve naturally as the viewer 108 provides additional feedback, with the system 100 continuing to draw connections between what is visible on screen and the deeper layers of meaning in the "psychological space" of the story and "out of video" information, such as information about the actors in the video.

This capability fundamentally differentiates embodiments of the present invention from platforms that only enable surface-level interactions with videos. While traditional systems treat videos as self-contained media units, embodiments of the present invention recognize them as portals to deeper spaces—whether narrative, educational, or persuasive—and enables genuine conversation about the underlying content rather than just the video presentation itself.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention integrate multiple technical components in a novel way to enable dynamic video feedback conversations. Embodiments of the present invention process and deliver video output through a video player, and implement temporal and spatial tracking of viewer feedback. The temporal component may capture, for example, timestamps or ranges within the video, while the spatial component may record specific coordinates or regions within video frames that the feedback references. This structured approach to feedback data enables the system to maintain precise associations between viewer interactions and the corresponding video content.

Embodiments of the present invention integrate machine learning in a way that represents an improvement to computer technology. For example, embodiments of the present invention may use a machine learning model to generate a feedback prompt back on the viewer feedback. Such a model may, for example, analyze both the feedback content and its associated temporal-spatial parameters to generate contextually relevant prompts.

The integration of these components creates a technically sophisticated system that coordinates video playback, structured feedback capture, and automated prompt generation. The system maintains temporal and spatial relationships throughout the feedback loop, ensuring that each component works in concert to enable dynamic, context-aware conversations about video content.

Furthermore, embodiments of the present invention implement specific technical steps that go beyond abstract concepts, demonstrating a concrete technological solution. For example, embodiments may process structured feedback data that contains precisely defined temporal and spatial components—the temporal data represents specific times or ranges within the video output, while the spatial data captures locations or regions within video frames. This structured approach requires sophisticated data processing to maintain the relationships between feedback and video content.

The use of machine learning model-based analysis represents a specific technical implementation that cannot be performed mentally or manually. This automated analysis and generation of a feedback prompt requires significant computational resources that cannot be replicated manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:
1. A computer-implemented method comprising:
   providing video output;
   receiving first feedback from a viewer of the video output, the first feedback including:
      feedback content;

temporal data representing a time within the video output; and spatial data representing a spatial location within the video output, wherein receiving the spatial data comprises receiving input from the viewer selecting a subset of a currently-rendered frame of the video output;

extracting data based on the selected subset of the currently-rendered frame of the video output, wherein the extracted data relates to at least one element within the video content;

receiving external data that is external to the video output, wherein the external data comprises contextual information related to the video content that is not contained within the video output, wherein the contextual information comprises at least one of character backstory information, historical context information, or information about a book or play on which the video output is based;

generating a feedback prompt, wherein generating the feedback prompt comprises providing at least some of the first feedback, at least some of the extracted data, and at least some of the external data as input to a machine learning model to generate the feedback prompt;

providing the feedback prompt to the viewer of the video output;

receiving second feedback from the viewer of the video output in response to the feedback prompt, the second feedback including:

second feedback content;

second temporal data representing a second time within the video output; and second spatial data representing a second spatial location within the video output;

generating a second feedback prompt based on the second feedback and the machine learning model, comprising providing the second feedback to the machine learning model to generate the second feedback prompt; and providing the second feedback prompt to the viewer of the video output;

wherein generating the second feedback prompt comprises providing at least some of the first feedback and at least some of the second feedback as input to the machine learning model to generate the second feedback prompt.

2. The method of claim 1, wherein providing the video output comprises:

receiving video input; and processing the video input to generate the video output.

3. The method of claim 1, wherein the feedback content comprises at least one of text feedback; emoji feedback; numeric rating feedback; choice feedback from among a plurality of choices; slider feedback; and comment feedback.

4. The method of claim 1, wherein the extracted data comprises at least one of:

object data representing objects identified in the video output;

character data representing characters identified in the video output;

scene data representing scenes identified in the video output;

activity data representing actions identified in the video output; and sentiment data representing emotions identified in the video output.

5. The method of claim 1, wherein the external data further comprises at least one of:

scene-specific information;

production information;

transcript data; or brand information.

6. The method of claim 1, further comprising generating video generation output based on at least one of:

the first feedback;

viewer behavior; and the feedback prompt; and modifying the video output based on the video generation output.

7. The method of claim 6, wherein modifying the video output comprises at least one of:

adding generated video data to existing video data in the video output;

removing video data from the video output; and replacing existing video data in the video output with generated video data.

8. A system comprising at least one non-transitory computer-readable medium having computer program instructions tangibly stored thereon, the computer program instructions being executable by at least one computer processor to perform a method, the method comprising:

providing video output;

receiving first feedback from a viewer of the video output, the first feedback including:

feedback content;

temporal data representing a time within the video output; and spatial data representing a spatial location within the video output, wherein receiving the spatial data comprises receiving input from the viewer selecting a subset of a currently-rendered frame of the video output;

extracting data based on the selected subset of the currently-rendered frame of the video output, wherein the extracted data relates to at least one element within the video content;

receiving external data, wherein the external data comprises contextual information related to the video content that is not contained within the video output, wherein the contextual information comprises at least one of character backstory information, historical context information, or information about a book or play on which the video output is based;

generating a feedback prompt, wherein generating the feedback prompt comprises providing at least some of the first feedback, at least some of the extracted data, and at least some of the external data as input to a machine learning model to generate the feedback prompt; and providing the feedback prompt to the viewer of the video output;

receiving second feedback from the viewer of the video output in response to the feedback prompt, the second feedback including:

second feedback content;

second temporal data representing a second time within the video output; and second spatial data representing a second spatial location within the video output;

generating a second feedback prompt based on the second feedback and the machine learning model, comprising providing the second feedback to the machine learning model to generate the second feedback prompt; and providing the second feedback prompt to the viewer of the video output;
wherein generating the second feedback prompt comprises providing at least some of the first feedback and at least some of the second feedback as input to the machine learning model to generate the second feedback prompt.

9. The system of claim 8, wherein providing the video output comprises:
receiving video input; and
processing the video input to generate the video output.

10. The system of claim 8, wherein the feedback content comprises at least one of text feedback; emoji feedback; numeric rating feedback; choice feedback from among a plurality of choices; slider feedback; and comment feedback.

11. The system of claim 8, wherein the extracted video data comprises at least one of:
object data representing objects identified in the video output;
character data representing characters identified in the video output;
scene data representing scenes identified in the video output;
activity data representing actions identified in the video output; and
sentiment data representing emotions identified in the video output.

12. The system of claim 8, wherein the external data comprises at least one of:
scene-specific information;
production information;
transcript data; and
brand information.

13. The system of claim 8, wherein the method further comprises generating video generation output based on at least one of:
the first feedback;
viewer behavior; and
the feedback prompt; and
modifying the video output based on the video generation output.

14. The system of claim 13, wherein modifying the video output comprises at least one of:
adding generated video data to existing video data in the video output;
removing video data from the video output; and
replacing existing video data in the video output with generated video data.

* * * * *